United States Patent
Hamilton (10) Patent No.: US 8,209,070 B2
(45) Date of Patent: Jun. 26, 2012

(54) METHODS AND SYSTEMS FOR EFFICIENTLY ORIENTING AN AGILE VEHICLE USING A GYROSCOPE ARRAY

(75) Inventor: Brian Hamilton, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 876 days.

(21) Appl. No.: 12/337,304

(22) Filed: Dec. 17, 2008

(65) Prior Publication Data

US 2010/0152953 A1    Jun. 17, 2010

(51) Int. Cl.
*B64G 1/36* (2006.01)
*G05D 1/00* (2006.01)
*G05D 3/00* (2006.01)
*G06F 7/00* (2006.01)
*G06F 17/00* (2006.01)

(52) U.S. Cl. .......... 701/13; 701/3; 701/4; 701/14; 701/226; 244/171; 244/158.4; 244/158.6; 244/164; 244/165

(58) Field of Classification Search .......... 701/3, 4, 701/5, 13, 14; 244/158.4, 158.6, 164, 165, 244/171, 175, 179
See application file for complete search history.

(56) References Cited

U.S. PATENT DOCUMENTS

| | | | |
|---|---|---|---|
| 3,741,500 A | 6/1973 | Liden | |
| 3,762,226 A | 10/1973 | Davis et al. | |
| 5,308,024 A | 5/1994 | Stetson, Jr. | |
| 5,437,420 A | 8/1995 | Rosen | |
| 5,681,012 A | 10/1997 | Rosmann et al. | |
| 6,131,056 A | 10/2000 | Bailey et al. | |
| 6,154,691 A | 11/2000 | Bailey | |
| 6,241,194 B1 | 6/2001 | Heiberg | |
| 6,305,647 B1 * | 10/2001 | Defendini et al. | 244/165 |
| 6,360,996 B1 * | 3/2002 | Bockman et al. | 244/165 |
| 6,648,274 B1 | 11/2003 | Bailey et al. | |
| 6,681,649 B2 | 1/2004 | Hyde et al. | |
| 6,684,182 B1 | 1/2004 | Gold et al. | |
| 6,813,596 B2 | 11/2004 | Ellis et al. | |
| 6,917,862 B2 | 7/2005 | Wie | |
| 7,014,150 B2 | 3/2006 | Peck et al. | |
| 7,171,290 B2 * | 1/2007 | Lagadec et al. | 701/13 |
| 7,246,776 B2 | 7/2007 | Peck et al. | |
| 7,364,120 B2 | 4/2008 | Peck | |
| 7,370,833 B2 | 5/2008 | Johnson et al. | |
| 7,561,947 B2 * | 7/2009 | Bonn et al. | 701/13 |
| 7,661,627 B2 * | 2/2010 | Defendini et al. | 244/165 |
| 7,690,602 B2 * | 4/2010 | Jackson et al. | 244/165 |
| 7,904,214 B2 * | 3/2011 | Heiberg | 701/13 |
| 2004/0140401 A1 * | 7/2004 | Yamashita | 244/165 |

(Continued)

*Primary Examiner* — Jack Keith
*Assistant Examiner* — Rami Khatib
(74) *Attorney, Agent, or Firm* — Ingrassia Fisher & Lorenz, P.C.

(57) ABSTRACT

Methods and systems are provided for orienting an agile vehicle using a control moment gyroscope array. A method comprises obtaining initial vehicle parameters for the vehicle and obtaining target vehicle parameters for the vehicle. The method further comprises determining command parameters based on a difference between the target vehicle parameters and the initial vehicle parameters, and simulating operation of the control moment gyroscope array using the command parameters and a torque value being at least equal to a maximum achievable torque for the control moment gyroscope array. When the simulated vehicle parameters are substantially equal to the target vehicle parameters, the method further comprises determining a torque profile for the control moment gyroscope array based on the simulated operation and operating the control moment gyroscope array using the torque profile.

20 Claims, 2 Drawing Sheets

U.S. PATENT DOCUMENTS

| | | |
|---|---|---|
| 2007/0124032 A1 | 5/2007 | Elgersma et al. |
| 2007/0129922 A1 | 6/2007 | Lee et al. |
| 2008/0035797 A1* | 2/2008 | Defendini et al. ............ 244/165 |
| 2008/0105787 A1 | 5/2008 | Hamilton et al. |
| 2008/0203230 A1* | 8/2008 | Ogo et al. ..................... 244/165 |
| 2008/0315039 A1* | 12/2008 | Rudd et al. .................... 244/164 |

* cited by examiner

METHODS AND SYSTEMS FOR EFFICIENTLY ORIENTING AN AGILE VEHICLE USING A GYROSCOPE ARRAY

TECHNICAL FIELD

The subject matter described herein relates generally to spacecraft attitude control systems, and more particularly, embodiments of the subject matter relate to methods and systems for orienting an agile vehicle using a gyroscope array.

BACKGROUND

Gyroscopes are currently used in a number of military and civilian applications. One common application involves using gyroscopes, known as control moment gyroscopes (CMGs) to control the attitude or orientation of a spacecraft. A CMG comprises a spinning rotor and one or more motorized gimbals, which are used to rotate the rotor (e.g., gimballing), which in turn alters the angular momentum of the rotor. This change in angular momentum produces a reactionary torque which causes the spacecraft to rotate to the desired attitude or orientation. Attitude control system and other spacecraft orienting applications generally utilize at least three CMGs, also known as a CMG array.

The direction of torque capable of being produced by an individual CMG varies as its gimbal is rotated. In addition, the maximum achievable rate of rotation of the gimbal (or gimbal rate) for the individual CMGs is limited by hardware, which in turn limits the amount of useful torque an individual CMG can produce. Commanding more torque than an individual CMG is capable of producing results in saturation of the individual CMG. Also, particular arrangements of the CMGs in the CMG array, known as singularities, limit the ability of the CMG array to produce torque in certain directions. Therefore, steering control laws or other control schemes have been developed to determine how the individual CMGs should be rotated to produce a desired overall torque (or a commanded torque), without causing singularities or saturation in the CMG array.

In some applications, it is desirable to be able to reposition a spacecraft as quickly as possible. For example, in imaging satellite applications, the satellite may need to be quickly repositioned as the satellite orbits in order to collect data for a desired target area at a desired time. As the satellite travels at a high rate of speed, for example, 14,000 miles per hour or more in orbit, the satellite must be properly positioned at a particular time during the orbit to capture data for a particular target area or region. In addition, the satellite may need to have a certain rotational velocity in order to maintain the integrity of the collected data (e.g., the images are not blurred). As a result, the spacecraft may need to be adjusted or moved with a large rotational acceleration and/or large rotational velocity. Conventional prior art attitude control systems utilize a constant torque command (or acceleration command) for the CMG array to reposition the spacecraft without saturating one or more of the CMGs. However, because the individual CMG gimbal rates vary throughout the duration of a torque command as the individual CMGs are moved, an individual CMG of the CMG array would be producing its maximum torque output at for brief instants, if at all. Thus, prior art methods fail to maximize the overall torque output capability of the CMG array.

BRIEF SUMMARY

A method is provided for orienting a vehicle using a control moment gyroscope array. The method comprises obtaining initial vehicle parameters for the vehicle and obtaining target vehicle parameters for the vehicle. The method further comprises determining command parameters based on a difference between the target vehicle parameters and the initial vehicle parameters, and simulating operation of the control moment gyroscope array using the command parameters and a torque value being at least equal to a maximum achievable torque for the control moment gyroscope array. When the simulated vehicle parameters are substantially equal to the target vehicle parameters, the method further comprises determining a torque profile for the control moment gyroscope array based on the simulated operation and operating the control moment gyroscope array using the torque profile.

In another embodiment, an attitude control system for an agile vehicle is provided. The attitude control system comprises a gyroscope array, the gyroscope array comprising a plurality of control moment gyroscopes, a communication module, a sensor system, and a control module coupled to the communication module, the sensor system, and the communication module. The control module is configured to determine first command parameters based on a difference between target vehicle parameters received by the communication module and initial vehicle parameters obtained by the sensor system. The control module determines simulated vehicle parameters based on simulated operation of the gyroscope array using the command parameters with a torque value that is greater than or equal to the maximum achievable torque for the gyroscope array. When the simulated vehicle parameters are substantially equal to the target vehicle parameters, the control module determines a torque profile for the gyroscope array based on the simulated operation and operates the gyroscope array using the torque profile.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first", "second" and other such numerical terms referring to structures do not imply a sequence or order unless clearly indicated by the context.

For the sake of brevity, conventional techniques related to attitude control systems, gyroscope controls, slew planning, satellite controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate generally to methods and systems for optimizing the torque produced by an array of gyroscopes. Although the subject matter may be described herein in the context of an agile vehicle such as an imaging satellite, various aspects of the subject matter may be implemented in other spacecraft or in other applications that utilize control moment gyroscopes (CMGs), and the subject matter is not intended to be limited to use with any particular vehicle. As described below, in an exemplary embodiment, operation of the gyroscope array to move the agile vehicle from an initial state (e.g., an initial attitude and rotational velocity) to a desired target state is simulated using a torque command that exceeds the torque capability of the gyroscope array. This nonlinear simulation utilizes steering control laws that result in CMG gimbal rate commands that prevent saturation of any individual CMG of the CMG array. Because the resulting torque profile is complex and nonlinear, iterative techniques are used to determine the appropriate torque directions and timing to achieve the desired target attitude and rotational velocity at the target time, such that the maximum torque profile for the array is produced. As a result, the vehicle can be repositioned more quickly and the torque capability of the array is more fully utilized.

Figure 1:
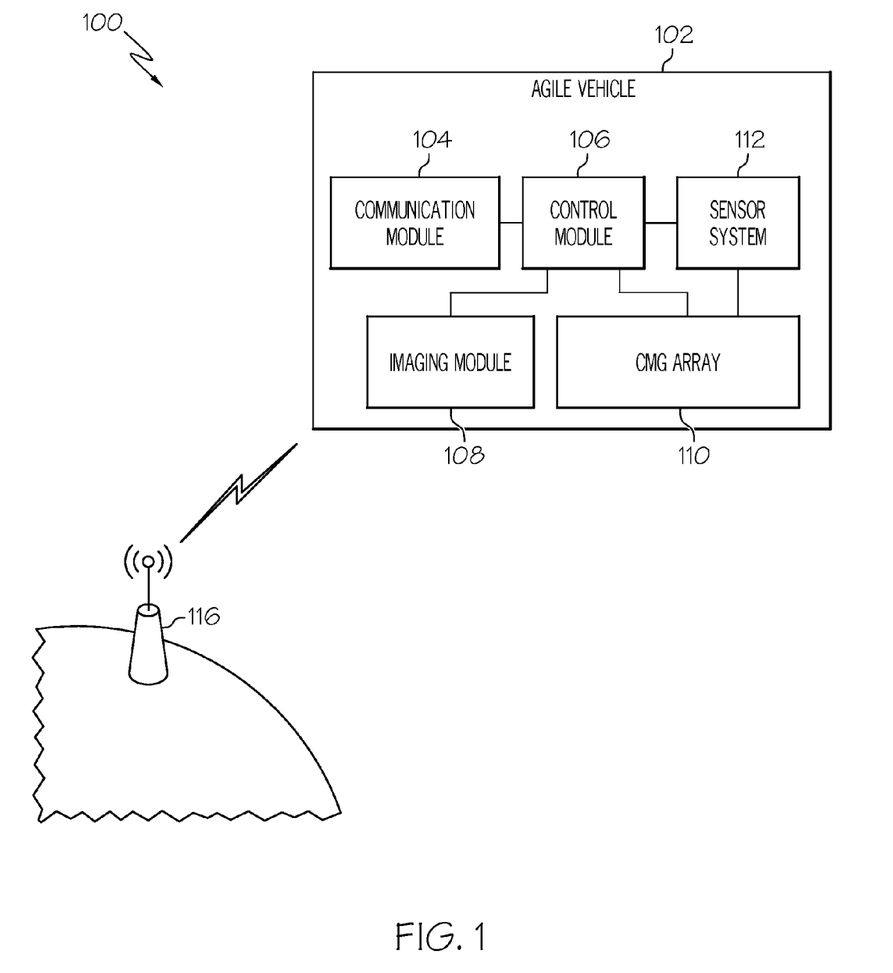
FIG. 1 is a block diagram of an attitude control system in accordance with one embodiment.

FIG. 1 depicts an exemplary embodiment of an attitude control system 100 suitable for use with an agile vehicle 102. In an exemplary embodiment, the agile vehicle 102 is realized as an imaging satellite that includes, without limitation, a communication module 104, a control module 106, an imaging module 108, a control moment gyroscope (CMG) array 110, and a sensor system 112. It should be understood that FIG. 1 is a simplified representation of an agile vehicle 102 for purposes of explanation and ease of description, and FIG. 1 is not intended to limit the application or scope of the subject matter in any way. In practice, the agile vehicle 102 may include numerous other devices and components for providing additional functions and features, as will be appreciated in the art. In an exemplary embodiment, the agile vehicle 102 is realized as a satellite or another suitable spacecraft which communicates with a terrestrial or ground control station 116, as described in greater detail below.

In an exemplary embodiment, the control module 106 is communicatively coupled to the communication module 104, the imaging module 108, the CMG array 110, and the sensor system 112. The sensor system 112 is coupled to the CMG array 110 and is configured to provide information about the operation of individual CMGs within the CMG array 110, as described in greater detail below. In this regard, the agile vehicle 102 and the ground station 116 are preferably configured to support bi-directional communication. The communication module 104 generally represents the hardware, software, firmware, processing logic, and/or other components that enable bi-directional communication between the agile vehicle 102 and the ground station 116, as will be appreciated in the art. In this regard, the communication module 104 may support one or more wireless data communication protocols. Any number of suitable wireless data communication protocols, techniques, or methodologies may be supported by the communication module 104, as will be appreciated in the art.

The control module 106 generally represents the hardware, software, firmware, processing logic, and/or other components of the agile vehicle 102 that enable the agile vehicle 102 to achieve unmanned operation and/or flight in order to achieve imaging data for desired imaging targets, as will be appreciated in the art and described in greater detail below. In this regard, the control module 106 and the communication module 104 are cooperatively configured to allow the transferring and/or uploading of target vehicle parameters and/or desired imaging targets from an associated ground station 116 to the agile vehicle 102 along with the transferring and/or downloading of imaging data from the imaging module 108 to the ground control station 116, as will be appreciated in the art and described in greater detail below. In addition, control module 106 controls the orientation of the agile vehicle 102 by providing torque and/or rate commands to the CMG array 110, as described in greater detail below.

The control module 106 may be implemented or realized with a general purpose processor, a content addressable memory, an application specific integrated circuit, a field programmable gate array, any suitable programmable logic device, discrete gate or transistor logic, discrete hardware components, or any combination thereof, designed to perform the functions described herein. In this regard, the control module 106 may be realized as a microprocessor, a controller, a microcontroller, a state machine, or the like. A control module 106 may also be implemented as a combination of computing devices, e.g., a plurality of microprocessors, or any other such configuration. In practice, control module 106 includes processing logic that may be configured to carry out the functions, techniques, and processing tasks associated with the operation of the agile vehicle 102, as described in greater detail below. Furthermore, the steps of a method or algorithm described in connection with the embodiments disclosed herein may be embodied directly in hardware, in firmware, in a software module executed by control module 106, or in any practical combination thereof. In an exemplary embodiment, the control module 106 may also include a suitable amount of memory to support the operation of the control module 106, as described in greater detail below. Memory may be realized as RAM memory, ROM memory, EEPROM memory, flash memory, registers, a hard disk, a removable disk, or any other form of storage medium or memory technology known in the art.

In an exemplary embodiment, the imaging module 108 is realized as one or more cameras adapted to capture imaging data (e.g., images and/or video). In this regard, imaging data should be understood as encompassing photographic data, video data, or other suitable forms of imaging data. Depending on the embodiment, the camera may be realized as a still camera, a digital camera, a video camera, an infrared camera, a radar-based imaging device, a multi-spectral imaging device, or another suitable imaging camera or device. For example, in accordance with one embodiment, the imaging module 108 comprises a still camera that is mounted and/or supported by the agile vehicle 102. In this embodiment, the camera has a fixed position relative to the agile vehicle 102, such that a change in the attitude, orientation, or position of the agile vehicle 102 produces an equivalent change in the field of view of the camera, as will be appreciated in the art. In an exemplary embodiment, the control module 106 and the communication module 104 are cooperatively configured to allow the transferring and/or downloading of imaging data from the imaging module 108 to the ground station 116, as will be appreciated in the art.

In an exemplary embodiment, the CMG array 110 includes a plurality of CMGs arranged such that each CMG imparts torque about a different axis, as will be appreciated in the art. In this regard, each CMG of the CMG array 110 comprises a rotating element or rotor mounted to a gimbal assembly, which in turn is mounted to the agile vehicle 102. The rotor (e.g., a wheel or disc) is configured to rotate about a spin axis, which in turn can be tilted or rotated by rotating a gimbal of the gimbal assembly about a gimbal axis. The motion or rotation of the gimbal produces a gyroscopic torque which is orthogonal to the spin axis and the gimbal axis. The gyroscopic torque is imparted or transferred to the agile vehicle 102 and causes a change in the attitude of the agile vehicle 102, as will be appreciated in the art. The CMG array 110 is preferably arranged based on inertial properties of the agile vehicle 102. Depending on the embodiment, the CMG array 110 may comprise any suitable CMG array geometry known in the art, such as a pyramid array, a roof array (e.g., a collinear array or collinear set of CMGs), a box array, or another suitable CMG array geometry.

In an exemplary embodiment, the control module 106 receives target vehicle parameters or other information concerning a desired maneuver (e.g., target vehicle parameters from the ground station 116 via communication module 104) and determines an appropriate torque command profile for the CMG array 110 to complete the desired maneuver, as described in greater detail below. The vehicle parameters define or are otherwise representative of the positioning and/or orientation state of the agile vehicle 102, wherein target vehicle parameters represent a desired state at a target time in the future. Based on the torque command profile, the control module 106 calculates the appropriate gimbal rate (e.g., the rate of rotation a gimbal about the gimbal axis) for each respective CMG which produces the commanded torque. The control module 106 preferably calculates the gimbal rates for the CMGs using one or more steering control laws to prevent singular conditions or saturation of a CMG. Various steering controls are well known, and therefore, the specific methods for determining torque commands and/or gimbal rate commands will not be described in detail herein. In an exemplary embodiment, the control module 106 provides the torque and/or gimbal rate commands to the CMG array 110 such that the movement of the CMGs produces the commanded torque while preventing conditions that lead to singularity and/or saturation of the CMG array 110. In this regard, the sensor system 112 includes one or more sensors configured to provide information concerning the state of the respective CMGs (e.g., the attitude of the spin axis) of the CMG array 110. The sensor system 112 may also provide information regarding the current attitude and rotational velocity (or rotational rate or angular velocity) of the agile vehicle 102.

Figure 2:
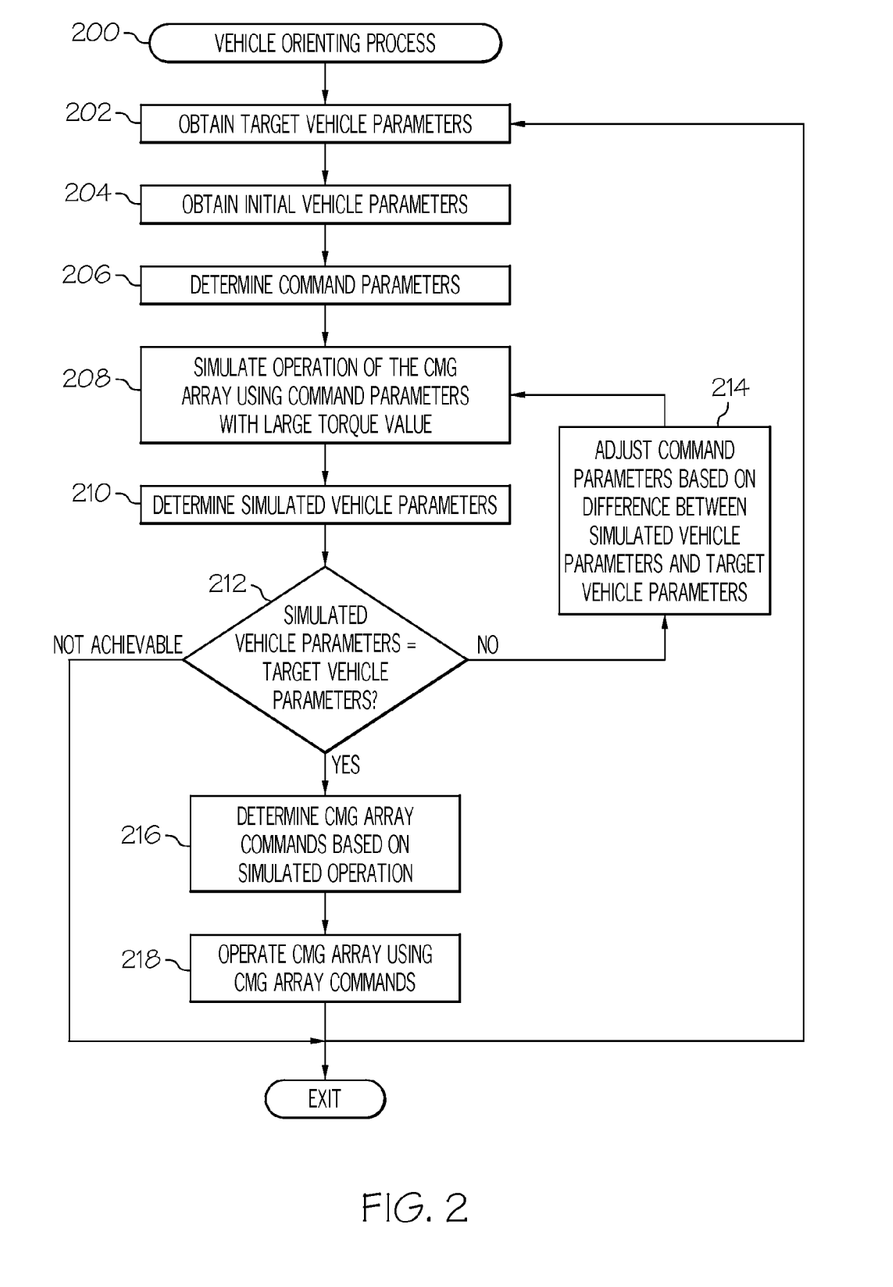
FIG. 2 is a flow diagram of a vehicle orienting process suitable for use with the attitude control system of FIG. 1.

Referring now to FIG. 2, in an exemplary embodiment, an attitude control system may be configured to perform a vehicle orienting process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the agile vehicle 102, the control module 106, the CMG array 110, the sensor system 112, or the ground station 116. It should be appreciated that any number of additional or alternative tasks may be included, and may be incorporated into a more comprehensive procedure or process having additional functionality not described in detail herein.

Referring again to FIG. 2, and with continued reference to FIG. 1, a vehicle orienting process 200 may be performed to control the orientation or attitude of a vehicle having a gyroscope array configured to adjust the attitude of the vehicle. In an exemplary embodiment, the vehicle orienting process 200 initializes by obtaining target vehicle parameters for the vehicle (task 202). The target vehicle parameters represent a desired orientation and/or maneuver for the vehicle at a target time in the future (e.g., a target future maneuver). In this regard, the target vehicle parameters may comprise a desired attitude and a desired rotational velocity for the agile vehicle 102 at the target time in the future. For example, in a satellite imagery application, the agile vehicle 102 may be orbiting about the Earth (or another celestial body) and acquiring data (e.g., imaging data via imaging module 108) regarding the Earth (or the celestial body that the agile vehicle 102 is orbiting). The agile vehicle 102 may be traveling with substantial velocity (e.g., 14,000 miles per hour or more for Earth orbit), and therefore, in order to obtain imaging data for a desired imaging target (e.g., a particular location or area), the agile vehicle 102 needs to have a particular attitude at a particular time in its orbit such that the imaging module 108 is properly oriented on the desired imaging target (e.g., the desired imaging target is within the field of view of the camera). Additionally, because the agile vehicle 102 may be traveling with a substantial velocity, to maintain the integrity of the collected data (e.g., to prevent the imaging data from being blurred), the target vehicle parameters may also comprise a desired rotational velocity at the target time. As such, the target vehicle parameters represent the desired attitude and the desired rotational velocity for the agile vehicle 102 needed to address the imaging module 108 on a desired imaging target at a particular time (e.g., the target time). In an exemplary embodiment, the agile vehicle 102 and/or control module 106 obtains or otherwise receives the target vehicle parameters from the ground station 116 via communication module 104. Depending on the embodiment, the ground station 116 may provide the target vehicle parameters (e.g., the target attitude and rotational velocity for a particular time) to the control module 106, or alternatively, the ground station 116 may provide information regarding the desired imaging target (e.g., the latitude and longitude) from which the control module 106 may calculate target vehicle parameters for the appropriate time in the future.

In an exemplary embodiment, the vehicle orienting process 200 continues by obtaining initial vehicle parameters for the vehicle (task 204). The initial vehicle parameters represent the attitude, rotational velocity, and the array momentum state for the agile vehicle 102 at an initial time. In this regard, the initial time represents or corresponds to an anticipated future time (e.g., the estimated or predicted time) when the desired torque profile command and/or gimbal rate command obtained by the vehicle orienting process (e.g., task 218) will begin being executed. As such, the initial vehicle parameters represent the estimated or predicted vehicle parameters at the initial time. In accordance with one embodiment, the vehicle orienting process 200 may be utilized in conjunction with a slew plan or imaging flight plan for the vehicle. A slew plan or imaging flight plan should be understood as referring to a series or sequence of maneuvers, wherein the control module 106 controls the CMG array 110 based on the slew plan to operate the agile vehicle 102 through the series or sequence of maneuvers to produce the desired attitude and/or rotational velocity of the agile vehicle 102 at particular instances. In this regard, the target vehicle parameters represent a desired attitude and/or rotational velocity for purposes of planning a target future maneuver of the slew plan, wherein the initial vehicle parameters refer to the vehicle parameters (e.g., attitude, rotational velocity, and array momentum state) after completing the previous maneuver. In this regard, the control module 106 may determine the initial vehicle parameters for the initial time (e.g., the vehicle parameters after completing the previous maneuver of the slew plan) by obtaining the current vehicle parameters (e.g., the current attitude, rotational velocity, and array momentum state when the vehicle orienting process 200 initializes) and calculating the initial vehicle parameters (e.g., the estimated attitude, rotational velocity, and array momentum state for the agile vehicle 102 at the initial time) based on information pertaining to the intervening maneuvers of the slew plan. In this regard, in an exemplary embodiment, the vehicle orienting process 200 may be executed several maneuvers in advance of the target future maneuver that is the subject of the vehicle orienting process 200.

In an exemplary embodiment, the vehicle orienting process 200 continues by determining command parameters for the CMG array based on the target vehicle parameters and the initial vehicle parameters (task 206). The command parameters represent estimated commands (e.g., torque commands or gimbal rate commands) that would theoretically result in the agile vehicle satisfying the target vehicle parameters at the target time if the CMG array were operated in accordance with the command parameters at the initial time. In this regard, the vehicle orienting process 200 may determine the command parameters based on the difference between the target vehicle parameters and the initial vehicle parameters. For example, based on the difference between initial attitude (e.g., the anticipated attitude at the initial time) and the target attitude, the control module 106 may determine, calculate, or otherwise estimate an acceleration torque direction which would maneuver the agile vehicle 102 from the initial attitude to the target attitude. In this regard, the vehicle orienting process 200 may also calculate or determine a deceleration torque direction to prevent the agile vehicle 102 from overshooting the target attitude, such that the agile vehicle 102 would be oriented at the target attitude at the target time. In an exemplary embodiment, the vehicle orienting process 200 also calculates or determines a deceleration time designating when the control module 106 would begin commanding the CMG array 110 to produce torque in the deceleration torque direction. In this regard, the deceleration time may be chosen as a time period or interval after the maneuver begins at the initial time, or be chosen as a time period or interval in advance of the target time. The vehicle orienting process 200 may also determine, calculate, or otherwise estimate the acceleration torque direction and deceleration torque direction based on the difference between the target rotational velocity and the initial rotational velocity of the agile vehicle 102, such that the agile vehicle 102 would theoretically be operating with the target rotational velocity at the target time.

In an exemplary embodiment, the vehicle orienting process 200 continues by simulating operation of the CMG array using the calculated command parameters with a large torque value (task 208). That is, the magnitude of the torque value for the torque commands used in simulating operation of the CMG array is chosen to be a large value, preferably greater than or equal to the maximum amount of torque that the CMG array can achieve or otherwise produce. In this regard, the simulated operation of the CMG array will result in the CMG array operating at the limit of its achievable torque at a particular instant in time. For example, the control module 106 may simulate operation of the CMG array 110 using a first torque command having a magnitude greater than or equal to the maximum achievable torque for the CMG array 110 and a direction equal to the acceleration torque direction up until the deceleration time. After the deceleration time, the control module 106 may simulate operation of the CMG array 110 with a second torque command having a magnitude greater than or equal to the maximum achievable torque for the CMG array 110 and a direction equal to the deceleration torque direction.

In an exemplary embodiment, the vehicle orienting process 200 simulates operation of the CMG array using one or more steering control laws such that none of the CMGs of the CMG array exceed their available gimbal rate limit. For example, when one CMG of the CMG array approaches or reaches its limit, the steering control laws limit the gimbal rate for the CMG and adjust the gimbal rates of the other CMGs of the CMG array to maintain the commanded torque direction. As a result, the resultant magnitude of torque produced by the CMG array (the resulting torque profile) in the commanded torque direction during the simulation will be less than the commanded magnitude, and will vary based on the instantaneous states of the CMGs throughout the simulated operation. However, by commanding a large amount of torque (e.g., greater than or equal to the maximum achievable by the CMG array), at least one CMG of the CMG array will be producing torque at or near its limit as often as possible throughout operation. In this manner, the CMG array will be producing the maximum amount of torque in the commanded direction without saturation or singularities in the CMG array. As a result, the vehicle may be accelerated (or decelerated) as quickly as possible in the commanded torque direction, although the magnitude of the acceleration (or deceleration) will vary over time. In other words, the vehicle may be accelerated from an initial attitude to a target attitude in the least amount of time.

In an exemplary embodiment, the vehicle orienting process 200 continues by determining simulated vehicle parameters based on the simulated operation of the CMG array and compares the simulated vehicle parameters to the target vehicle parameters (tasks 210, 212). For example, based on the simulated operation of the CMG array using the command parameters and the large torque value, the control module 106 may determine or identify simulated vehicle parameters (e.g., a simulated attitude and a simulated rotational velocity) at the target time. It will be appreciated in the art that the simulated vehicle parameters at the target time will vary based upon the command parameters and the torque profile that results from application of the steering control laws. The vehicle orienting process 200 compares the simulated vehicle parameters to the target vehicle parameters to determine whether the simulated vehicle parameters are equal to the target vehicle parameters. In accordance with one embodiment, the vehicle orienting process 200 determines whether the simulated vehicle parameters are substantially equal to the target vehicle parameters, that is, whether the simulated vehicle parameters are equal to the target vehicle parameters within a threshold tolerance consistent with the requirements of the particular mission.

In response to determining that the simulated vehicle parameters are not equal to the target vehicle parameters, the vehicle orienting process 200 continues by adjusting the command parameters based on the difference between the simulated vehicle parameters and the target vehicle parameters (task 214). For example, based upon difference between the simulated vehicle attitude and rotational velocity at the target time and the target vehicle attitude and rotational velocity, vehicle orienting process 200 may adjust the acceleration torque direction, the deceleration torque direction, and the deceleration time. The vehicle orienting process 200 then repeats the task of simulating operation of the CMG array using the adjusted acceleration torque direction, the adjusted deceleration torque direction, and the adjusted deceleration time, as described above (task 208). The control module 106 may simulate operation of the CMG array 110 with a torque command having a magnitude greater than or equal to the maximum achievable torque for the CMG array 110 and the adjusted acceleration torque direction up until the adjusted deceleration time. After the adjusted deceleration time, the control module 106 may simulate operation of the CMG array 110 with a torque command having a magnitude greater than or equal to the maximum achievable torque for the CMG array 110 and a direction equal to the adjusted deceleration torque direction.

The vehicle orienting process 200 continues by repeating the steps of determining the simulated vehicle parameters based on the simulated operation of the CMG array using the adjusted command parameters and comparing the simulated vehicle parameters to the target vehicle parameters (tasks 210, 212). If the simulated vehicle parameters are not equal to the target vehicle parameters, the vehicle orienting process 200 repeats the loop defined by tasks 208, 210, 212, and 214 and makes adjustments to the adjusted command parameters as described above. In an exemplary embodiment, the vehicle orienting process 200 iteratively adjusts the command parameters based on the difference between the simulated vehicle parameters and the target vehicle parameters using a suitable iteration method, such as gradient descent, Newton's method, or another suitable iteration method known in the art. In this manner, if the target vehicle parameters are achievable by the CMG array, the simulated vehicle parameters will converge to the target vehicle parameters. Alternatively, if the vehicle orienting process 200 determines that the target vehicle parameters are not achievable by the CMG array (e.g., within the threshold tolerance), the vehicle orienting process 200 may terminate or exit and generate an alert or otherwise notify a user (e.g., an operator at the ground station 116), drop (or remove) an imaging target from the slew plan, or proceed in accordance with a predefined action.

In an exemplary embodiment, once the simulated vehicle parameters are substantially equal to the target vehicle parameters, the vehicle orienting process 200 determines commands for the CMG array based on the results of the simulated operation of the CMG array (task 216). In accordance with one embodiment, the vehicle orienting process 200 determines a torque profile command for the CMG array based on the simulated operation. Depending on the embodiment, the control module 106 may store the torque profile command (e.g., in memory) for future use (e.g., as part of a slew plan), or immediately begin operating the CMG array using the torque profile command (task 218). In another embodiment, the vehicle orienting process 200 may determine gimbal rate commands for each CMG of the CMG array based on the simulated operation. For example, the control module 106 may determine the individual gimbal rates that were generated during the simulation in response to applying the steering control laws. Depending on the embodiment, the control module 106 may store the gimbal rate commands for future use, or immediately begin operating the individual CMGs of the CMG array with the respective gimbal rate command (task 218). The loop defined by tasks 202, 204, 206, 208, 210, 212, 214, 216 and 218 may repeat as desired to enable continuously and dynamically repositioning the vehicle throughout operation.

To briefly summarize, the methods and systems described above allow for an agile vehicle to be repositioned quickly and accurately using a CMG array. Based on target vehicle parameters, the CMG array is simulated using a torque command that exceeds the torque capability of the CMG array, such that the maximum torque profile for the CMG array is produced. Because the resulting torque profile is complex and nonlinear, iterative techniques are used to determine the appropriate torque directions and timing to achieve the desired target attitude and rotational velocity at the target time. As a result, the vehicle can be repositioned quickly, and achieve more maneuvers per orbit.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for orienting a vehicle using a control moment gyroscope array, the method comprising:
    obtaining initial vehicle parameters for the vehicle;
    obtaining target vehicle parameters for the vehicle;
    determining command parameters based on a difference between the target vehicle parameters and the initial vehicle parameters;
    simulating operation of the control moment gyroscope array using the command parameters with a first torque value to obtain simulated vehicle parameters, the first torque value being at least equal to a maximum achievable torque for the control moment gyroscope array;
    determining a torque profile for the control moment gyroscope array based on the simulated operation when the simulated vehicle parameters are substantially equal to the target vehicle parameters; and
    operating the control moment gyroscope array using the torque profile.

2. The method of claim 1, further comprising:
    determining that the simulated vehicle parameters are not substantially equal to the target vehicle parameters;
    adjusting the command parameters based on the difference between the simulated vehicle parameters and the target vehicle parameters, wherein adjusting the command parameters results in adjusted command parameters; and
    simulating operation of the control moment gyroscope array using the adjusted command parameters with the first torque value to obtain simulated vehicle parameters.

3. The method of claim 2, wherein adjusting the command parameters comprises adjusting the command parameters based on the difference between the simulated vehicle parameters and the target vehicle parameters using an iteration method.

4. The method of claim 1, wherein:
initial vehicle parameters comprise a first attitude and a first rotational rate;
target vehicle parameters comprise a target attitude and a target rotational rate; and
determining command parameters comprises determining command parameters based on the difference between the target attitude and the first attitude and the difference between the first rotational rate and the target rotational rate.

5. The method of claim 1, the target vehicle parameters having a target time, wherein determining command parameters comprises:
determining an acceleration torque direction;
determining a deceleration torque direction; and
determining a deceleration time, the deceleration time being chosen before the target time.

6. The method of claim 5, wherein simulating operation of the control moment gyroscope array comprises:
simulating operation of the control moment gyroscope array using a first torque command before the deceleration time, the first torque command comprising the first torque value in the acceleration torque direction; and
simulating operation of the control moment gyroscope array using a second torque command after the deceleration time, the second torque command comprising the first torque value in the deceleration torque direction.

7. The method of claim 5, further comprising:
determining that the simulated vehicle parameters are not substantially equal to the target vehicle parameters;
adjusting the command parameters based on the difference between the simulated vehicle parameters and the target vehicle parameters, wherein adjusting the command parameters results in an adjusted acceleration torque direction, an adjusted deceleration torque direction, and an adjusted deceleration time;
simulating operation of the control moment gyroscope array using a third torque command before the adjusted deceleration time, the third torque command comprising the first torque value in the adjusted acceleration torque direction; and
simulating operation of the control moment gyroscope array using a fourth torque command after the adjusted deceleration time, the fourth torque command comprising the first torque value in the adjusted deceleration torque direction.

8. The method of claim 7, wherein adjusting the command parameters comprises adjusting the command parameters based on the difference between the simulated vehicle parameters and the target vehicle parameters using an iteration method.

9. The method of claim 1, wherein simulating operation of the control moment gyroscope array comprises simulating operation of the control moment gyroscope array based on the command parameters and the first torque value using a steering control law.

10. The method of claim 9, wherein:
simulating operation of the control moment gyroscope array using the steering control law produces a resulting torque profile; and
determining the torque profile comprises storing the resulting torque profile.

11. A method for controlling an attitude of an agile vehicle using a plurality of gyroscopes, the agile vehicle having an initial attitude, the method comprising:
obtaining a target attitude for the agile vehicle at a target time;
determining a first torque direction based on a difference between the target attitude and the initial attitude;
simulating operation of the plurality of gyroscopes with a first torque value in the first torque direction, the first torque value being greater than or equal to a maximum achievable torque for the plurality of gyroscopes, wherein simulating operation of the plurality of gyroscopes results in a simulated attitude for the agile vehicle at the target time; and
determining rate commands for each gyroscope of the plurality of gyroscopes when the simulated attitude is substantially equal to the target attitude, wherein the plurality of gyroscopes are commanded using the rate commands to control the attitude of the agile vehicle.

12. The method of claim 11, the agile vehicle having an initial rotational velocity, the method further comprising obtaining a target rotational velocity for the agile vehicle at the target time wherein:
determining the first torque direction comprises determining the first torque direction based on a difference between the target rotational velocity and the initial rotational velocity;
simulating operation of the plurality of gyroscopes results in a simulated rotational velocity for the agile vehicle at the target time; and
determining rate commands comprises determining rate commands for each gyroscope of the plurality of gyroscopes if the simulated rotational velocity is substantially equal to the target rotational velocity.

13. The method of claim 12, further comprising:
determining a deceleration torque direction; and
determining a deceleration time, the deceleration time being chosen before the target time.

14. The method of claim 13, wherein simulating operation of the plurality of gyroscopes comprises:
simulating operation of the plurality of gyroscopes using a first torque command before the deceleration time, the first torque command comprising the first torque value in the first torque direction; and
simulating operation of the plurality of gyroscopes using a second torque command after the deceleration time, the second torque command comprising the first torque value in the deceleration torque direction.

15. The method of claim 14, wherein if the simulated rotational velocity is not substantially equal to the target rotational velocity, the method further comprises repeating the steps of:
iteratively adjusting the first torque direction, the deceleration torque direction, and the deceleration time based on a difference between the simulated rotational velocity and the target rotational velocity, wherein adjusting the first torque direction, the deceleration torque direction, and the deceleration time results in an adjusted first torque direction, an adjusted deceleration torque direction, and an adjusted deceleration time;
simulating operation of the plurality of gyroscopes using a third torque command before the adjusted deceleration time, the third torque command comprising the first torque value in the adjusted first torque direction; and
simulating operation of the plurality of gyroscopes using a fourth torque command after the adjusted deceleration time, the fourth torque command comprising the first torque value in the adjusted deceleration torque direction.

16. The method of claim 11, wherein if the simulated attitude is not substantially equal to the target attitude, the method further comprises:
adjusting the first torque direction based on a difference between the simulated attitude and the target attitude, wherein adjusting the first torque direction results in an adjusted first torque direction;
simulating operation of the plurality of gyroscopes with the first torque value in the adjusted first torque direction, wherein simulating operation of the plurality of gyroscopes results in an adjusted simulated attitude for the agile vehicle at the target time; and
determining rate commands for each gyroscope of the plurality of gyroscopes if the adjusted simulated attitude is substantially equal to the target attitude, wherein the plurality of gyroscopes are commanded using the rate commands to control the attitude of the agile vehicle.

17. The method of claim 16, wherein adjusting the first torque direction comprises iteratively adjusting the first torque direction based on a difference between the simulated attitude and the target attitude.

18. An attitude control system for an agile vehicle, the attitude control system comprising:
a gyroscope array, the gyroscope array comprising a plurality of control moment gyroscopes, the gyroscope array having a maximum achievable torque;
a communication module configured to receive target vehicle parameters;
a sensor system configured to obtain initial vehicle parameters for the agile vehicle;
a control module coupled to the communication module, the sensor system, and the communication module, wherein the control module is configured to:
determine first command parameters based on a difference between the target vehicle parameters and the initial vehicle parameters;
determine simulated vehicle parameters based on simulated operation of the gyroscope array using the first command parameters with a first torque value, the first torque value being greater than or equal to the maximum achievable torque;
determine a torque profile for the gyroscope array based on the simulated operation when the simulated vehicle parameters are substantially equal to the target vehicle parameters; and
operate the gyroscope array using the torque profile.

19. The attitude control system of claim 18, wherein the control module is configured to:
adjust the first command parameters based on the difference between the simulated vehicle parameters and the target vehicle parameters if the simulated vehicle parameters are not substantially equal to the target vehicle parameters, wherein adjusting the command parameters results in second command parameters; and
determine simulated vehicle parameters based on simulated operation of the gyroscope array using the second command parameters with the first torque value.

20. The attitude control system of claim 18, wherein the simulated operation of the gyroscope array using the first command parameters comprises:
simulating operation of the gyroscope array with the first torque value in an initial torque direction before a first time; and
simulating operation of the gyroscope array with the first torque value in a deceleration torque direction after the first time.

* * * * *